(No Model.)
J. F. McMILLIN.
MILK CAN.
No. 352,831. Patented Nov. 16, 1886.
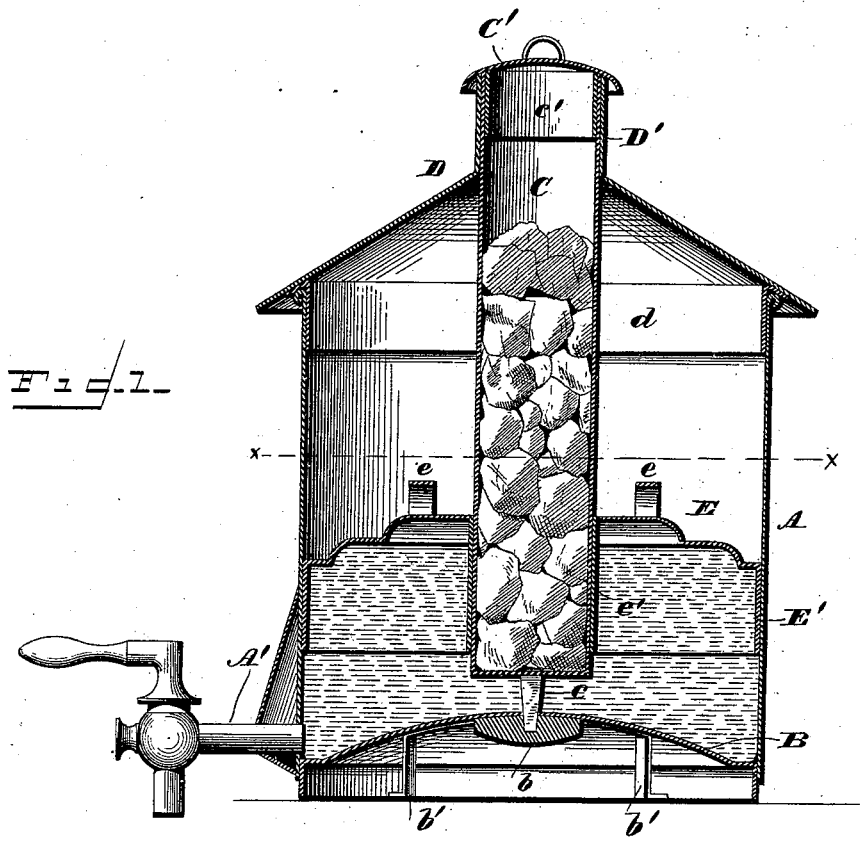
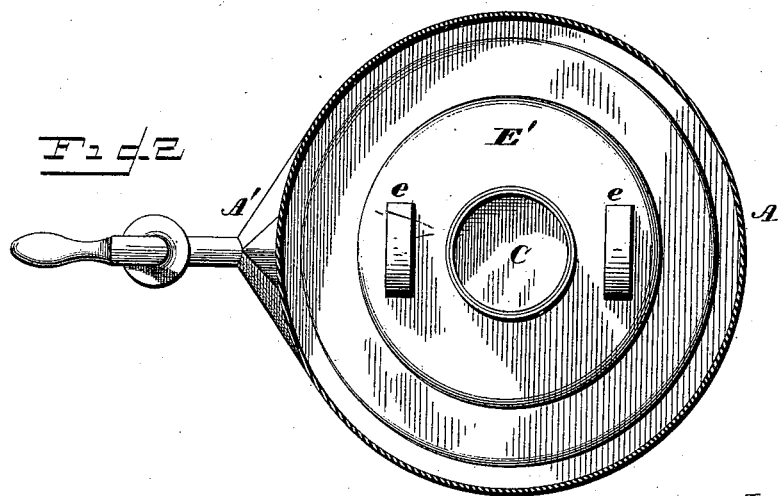
WITNESSES
G. S. Elliott
Josephus F. McMillin
INVENTOR
Attorney

UNITED STATES PATENT OFFICE.

JOSEPHUS F. McMILLIN, OF MOUNT PLEASANT, PENNSYLVANIA.

MILK-CAN.

SPECIFICATION forming part of Letters Patent No. 352,831, dated November 16, 1886.

Application filed September 9, 1886. Serial No. 213,158. (No model.)

*To all whom it may concern:*

Be it known that I, JOSEPHUS F. MCMILLIN, a citizen of the United States of America, residing at Mount Pleasant, in the county of Westmoreland and State of Pennsylvania, have invented certain new and useful Improvements in Milk-Cans; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.
My invention relates to certain new and useful improvements in milk-cans, the object of my invention being to provide a means whereby the milk can be cooled and will be prevented from churning in the can; and to this end my invention consists in the special construction and combination of the parts, as will be hereinafter fully set forth, and specifically pointed out in the claims.

In the accompanying drawings, which illustrate my invention, Figure 1 is a vertical sectional view of a milk-can constructed in accordance with my improvement, and Fig. 2 is a transverse sectional view taken through the line x x of Fig. 1.
A refers to the body of the milk-can, which has attached at the lower edge thereof a bottom, B, which is concave in cross-section, as shown, and to the center under side thereof is attached a metallic block, b, which is provided at its upper edge with a perforation for the reception of a downwardly-projecting pin which is attached to the center of the ice-tube C, so as to hold said ice-tube in a central position within the milk-can. The concave-bottom milk-can is also provided with a series of depending legs or feet, b', which are attached thereto in any suitable manner, so as to form a further support for said bottom. The outer edge of the bottom B is bent at an angle, so that its periphery will be parallel with the bottom of the milk-can A, to which it is secured by solder, and said downwardly-depending edge extends below the bottom edge of the milk-can, so that said can will rest thereon, thereby preventing the bottom edge of the vessel A coming in contact with the object upon which the can is placed, so that the lower edge thereof will not be bent, thus preventing to a great extent leaks which are liable to occur in the bottom of said can, and avoiding the space which is usually present in the ordinary manner of attaching the bottom of milk-vessels to the sides, which leave spaces within which the milk is liable to accumulate and sour.

The milk-can proper is provided at its front end with a spigot, A', which is suitably braced thereto, and at its sides handles are to be attached. The upper edge of the vessel A is provided with a bead of ordinary construction.

D refers to the top of the milk-can, which is conical in cross-section, as shown, the upper portion thereof having an opening which is surrounded by a vertical wall, D', and the lower end of said top D is also provided with a downwardly-projecting flange, d, which is adapted to lie within the upper portion of the vessel A, said flange d having its upper end bent so as to be parallel with the inclined top to which it is secured, thus providing said flange with an upwardly-projecting portion which will rest directly upon the bead of the upper portion of the vessel, so that when the cover is placed in position with any considerable force there will be no liability or danger of separating the flange d from the top D. The opening in the upper portion of the top D and the vertically-extended portion D' is of sufficient size to receive the ice-containing vessel C, which is provided at its base with a downwardly-projecting pin, c, which rests within the recess in the metallic block b, so as to hold the ice-containing vessel at a slight distance above the bottom B, so that the milk may circulate under said vessel C.

The ice-vessel C is provided with a cover, C', which has rigidly attached thereto a downwardly-projecting flange, c', which will fit in the upper part of the ice-containing chamber C. The top to which said flange is attached is bent downwardly at its outer edge, so as to lie over the upper edges of the wall of the upwardly-projecting portion D' of the top, and by the hereinbefore-described means the ice-chamber is held in a vertical position within the vessel A.

E refers to a float, which consists of a top which is struck up of a single piece of metal and provided with handles e e. This float is provided at its outer edge with circular downwardly-projecting walls E', and centrally with an annular depending wall, e', which extends from the upper edge thereof to a line with the lower edge of the depending wall E'. This float will, when placed within the vessel A, as shown, hold a sufficient amount of air to prevent the same sinking to the bottom of the can, and will prevent the milk "churning" within the vessel. Of course as the milk is drawn out of the spigot a' the float E will descend.

I am aware that prior to my invention it has been proposed to provide milk-cans with a central ice-tube and a float, as shown in Patent No. 280,820, and I do not claim such as my invention.

I am aware that prior to my invention it has been proposed to provide milk-cans with ice containers or chambers which are adapted to be held securely within said vessel, and also to provide such milk-cans with floats, and I do not therefore claim such construction, broadly; but

What I claim as new, and desire to secure by Letters Patent, is—

In combination with a vessel, A, a concave bottom, B, attached to the lower edge thereof and provided centrally with a block, b, an ice-containing vessel, C, provided at its base with a downwardly-projecting pin, c, a top, D, provided near its lower edge with a flange, d, an upwardly-extending wall, D', a cover, C', and float E, adapted to move vertically on the ice-chamber, the parts being organized substantially as shown, and for the purpose set forth.

In testimony whereof I affix my signature in presence of two witnesses.

JOSEPHUS F. McMILLIN.

Witnesses:
WM. M. JORDAN,
FRANK BROWN.